US008782396B2

(12) United States Patent
 Ziola et al.

(10) Patent No.: US 8,782,396 B2
(45) Date of Patent: Jul. 15, 2014

(54) AUTHENTICATION WITH PHYSICAL UNCLONABLE FUNCTIONS

(75) Inventors: Thomas Ziola, Merlo Park, CA (US); Zdenek Paral, San Jose, CA (US); Srinivas Devadas, Lexington, MA (US); Gookwon Edward Suh, Palo Alto, CA (US); Vivek Khandelwal, Santa Clara, CA (US)

(73) Assignee: Verayo, Inc., San Jose, CA (US)

( * ) Notice: Subject to any disclaimer, the term of this patent is extended or adjusted under 35 U.S.C. 154(b) by 1113 days.

(21) Appl. No.: 12/234,095

(22) Filed: Sep. 19, 2008

(65) Prior Publication Data

US 2009/0083833 A1  Mar. 26, 2009

Related U.S. Application Data

(60) Provisional application No. 60/973,505, filed on Sep. 19, 2007, provisional application No. 61/018,618, filed on Jan. 2, 2008.

(51) Int. Cl.
 *H04L 9/32* (2006.01)
(52) U.S. Cl.
 CPC .................................. *H04L 9/3271* (2013.01)
 USPC ......................................................... 713/155
(58) Field of Classification Search
 CPC .................................................. H04L 9/3271
 USPC ......................................................... 713/155
 See application file for complete search history.

(56) References Cited

U.S. PATENT DOCUMENTS

| 4,985,614 A | 1/1991 | Pease |
| 5,177,352 A | 1/1993 | Carson et al. |
| 5,180,901 A | 1/1993 | Hiramatsu |
| 5,204,902 A | 4/1993 | Reeds, III et al. |
| 5,247,577 A | 9/1993 | Bailey et al. |
| 5,375,169 A | 12/1994 | Seheidt et al. |
| 5,388,157 A | 2/1995 | Austin |

(Continued)

FOREIGN PATENT DOCUMENTS

| CA | 2344429 | 3/2000 |
| DE | 19843424 | 3/2000 |

(Continued)

OTHER PUBLICATIONS

Blaise Gassend et al., "Silicon Physical Random Functions", MIT, Proceedings of the Computer and Communication Security Conference, Nov. 2002, Memo 456.

(Continued)

*Primary Examiner* — Jacob Lipman
(74) *Attorney, Agent, or Firm* — Occhiuti & Rohlicek LLP

(57) ABSTRACT

Physical Unclonable Functions (PUFs) for authentication can be implemented in a variety of electronic devices including FPGAs, RFIDs, and ASICs. In some implementations, challenge-response pairs corresponding to individual PUFs can be enrolled and used to determine authentication data, which may be managed in a database. Later when a target object with a PUF is intended to be authenticated a set (or subset) of challenges are applied to each PUF device to authenticate it and thus distinguish it from others. In some examples, authentication is achieved without requiring complex cryptography circuitry implemented on the device. Furthermore, an authentication station does not necessarily have to be in communication with an authority holding the authentication data when a particular device is to be authenticated.

19 Claims, 5 Drawing Sheets

(56) References Cited

U.S. PATENT DOCUMENTS

| | | | |
|---|---|---|---|
| 5,528,231 A | 6/1996 | Patarin | |
| 5,768,382 A | 6/1998 | Schneier et al. | |
| 5,818,738 A | 10/1998 | Effing | |
| 5,862,094 A | 1/1999 | Kawabata | |
| 5,883,956 A | 3/1999 | Le et al. | |
| 5,920,628 A | 7/1999 | Indeck | |
| 5,963,104 A | 10/1999 | Buer | |
| 5,991,617 A * | 11/1999 | Powell | 455/410 |
| 6,026,293 A | 2/2000 | Osborn | |
| 6,161,213 A | 12/2000 | Lofstrom | |
| 6,233,339 B1 | 5/2001 | Kawano et al. | |
| 6,246,254 B1 | 6/2001 | Choukalos et al. | |
| 6,289,292 B1 | 9/2001 | Charlton et al. | |
| 6,289,453 B1 | 9/2001 | Walker et al. | |
| 6,289,455 B1 | 9/2001 | Kocher et al. | |
| 6,301,695 B1 | 10/2001 | Burnham et al. | |
| 6,305,005 B1 | 10/2001 | Burnham | |
| 6,324,676 B1 | 11/2001 | Burnham et al. | |
| 6,363,485 B1 | 3/2002 | Adams | |
| 6,386,456 B1 | 5/2002 | Chen et al. | |
| 6,402,028 B1 | 6/2002 | Graham, Jr. et al. | |
| 6,529,793 B1 | 3/2003 | Beffa | |
| 6,535,016 B2 | 3/2003 | Choukalos et al. | |
| 6,640,305 B2 | 10/2003 | Kocher et al. | |
| 6,704,871 B1 | 3/2004 | Kaplan et al. | |
| 6,708,273 B1 | 3/2004 | Ober et al. | |
| 6,738,788 B1 | 5/2004 | Horng et al. | |
| 6,802,447 B2 | 10/2004 | Horng | |
| 6,848,049 B1 | 1/2005 | Talliet | |
| 6,898,708 B2 | 5/2005 | Hori et al. | |
| 6,941,180 B1 | 9/2005 | Fischer et al. | |
| 6,941,536 B2 | 9/2005 | Muranaka | |
| 7,005,733 B2 | 2/2006 | Kommerling et al. | |
| 7,131,001 B1 | 10/2006 | Johnson | |
| 7,143,436 B2 | 11/2006 | Yamaguchi et al. | |
| 7,191,339 B1 | 3/2007 | Trimberger | |
| 7,191,340 B2 | 3/2007 | Wuidart et al. | |
| 7,210,634 B2 | 5/2007 | Sapiro | |
| 7,216,232 B1 | 5/2007 | Cox et al. | |
| 7,243,236 B1 | 7/2007 | Sibert | |
| 7,249,108 B1 | 7/2007 | Walmsley et al. | |
| 7,251,730 B2 | 7/2007 | Rose et al. | |
| 7,282,377 B2 | 10/2007 | Muranaka | |
| 7,568,113 B2 | 7/2009 | Linnartz | |
| 7,577,850 B2 | 8/2009 | Barr | |
| 2001/0032318 A1 | 10/2001 | Yip et al. | |
| 2001/0033012 A1 | 10/2001 | Kommerling et al. | |
| 2002/0065574 A1 | 5/2002 | Nakada | |
| 2002/0095594 A1 | 7/2002 | Dellmo et al. | |
| 2002/0106087 A1 | 8/2002 | Lotspiech et al. | |
| 2002/0107798 A1 | 8/2002 | Hameau et al. | |
| 2002/0128983 A1 | 9/2002 | Wrona et al. | |
| 2002/0150252 A1 | 10/2002 | Wong | |
| 2002/0188857 A1 | 12/2002 | Orlando et al. | |
| 2002/0199110 A1 | 12/2002 | Kean | |
| 2003/0140241 A1 | 7/2003 | England et al. | |
| 2003/0204731 A1 | 10/2003 | Pochuev et al. | |
| 2003/0204743 A1 * | 10/2003 | Devadas et al. | 713/200 |
| 2003/0219121 A1 | 11/2003 | Van Someren | |
| 2004/0136529 A1 | 7/2004 | Rhelimi et al. | |
| 2004/0148509 A1 | 7/2004 | Wu | |
| 2005/0051351 A1 | 3/2005 | De Jongh et al. | |
| 2006/0000900 A1 * | 1/2006 | Fernandes et al. | 235/380 |
| 2007/0038871 A1 | 2/2007 | Kahlman et al. | |
| 2007/0039046 A1 | 2/2007 | Van Dijk et al. | |
| 2007/0044139 A1 | 2/2007 | Tuyls et al. | |
| 2008/0044027 A1 | 2/2008 | Van Dijk | |
| 2008/0059809 A1 | 3/2008 | Van Dijk | |
| 2008/0106605 A1 | 5/2008 | Schrijen et al. | |
| 2009/0292921 A1 | 11/2009 | Braun et al. | |
| 2010/0073147 A1 | 3/2010 | Guajardo Merchan et al. | |
| 2012/0192252 A1 * | 7/2012 | Kuo et al. | 726/4 |

FOREIGN PATENT DOCUMENTS

| | | |
|---|---|---|
| EP | 1100058 | 5/2001 |
| EP | 1341214 | 9/2003 |
| WO | WO00/17826 | 3/2000 |
| WO | WO01/50530 | 7/2001 |
| WO | WO02/13452 | 2/2002 |
| WO | WO02/45139 | 6/2002 |
| WO | WO03/107201 | 12/2003 |
| WO | WO2004/102302 | 11/2004 |
| WO | WO2004/104899 | 12/2004 |
| WO | WO2004/105125 | 12/2004 |
| WO | WO2004/114122 | 12/2004 |
| WO | WO2005/043805 | 5/2005 |
| WO | WO2005/048179 | 5/2005 |
| WO | WO2005/048256 | 5/2005 |
| WO | WO2005/059629 | 6/2005 |
| WO | WO2005/086158 | 9/2005 |
| WO | WO2006/038183 | 4/2006 |
| WO | WO2006/040724 | 4/2006 |
| WO | WO2006/067739 | 6/2006 |
| WO | WO2006/082540 | 8/2006 |
| WO | WO2007/007229 | 1/2007 |
| WO | WO2007/023420 | 3/2007 |
| WO | WO2007/031908 | 3/2007 |
| WO | WO2007/036024 | 4/2007 |
| WO | WO2007/063473 | 6/2007 |
| WO | WO2007/063475 | 6/2007 |
| WO | WO2007/072450 | 6/2007 |
| WO | WO2007/116368 | 10/2007 |
| WO | WO2008/015603 | 2/2008 |

OTHER PUBLICATIONS

Anderson, Ross et al. "Low Cost Attacks on Tamper Resistant Devices". Cambridge University, Cambridge, England. Apr. 1997.

Anderson, Ross et al. "Tamper Resistance—a Cautionary Note". Cambridge University, Cambridge, England. Nov. 1996.

Boning, Duane S. et al., "Models of Process Variations in Device and Interconnect," Massachusetts Insitute of Technology, Cambridge, MA Aug. 23, 1999.

Devadas, Srinivas et al., "Synthesis of Robust Delay-Fault Testable Circuits: Theory" Massachusetts Institute of Technology, Cambridge, MA Jan. 1992.

Devadas, Srinivas et al., "Synthesis of Robust Delay-Fault Testable Circuits: Practice" Massachusetts Institute of Technology, Cambridge, MA Mar. 1992.

Gassend, Blaise et al., "Silicon Physical Unknown Functions and Secure Smartcards," Massachusetts Institute of Technology, Cambridge, MA May 13, 2002.

Gassend, Blaise et al. "Controlled Physical Unknown Functions: Applications to Secure Smartcards and Certified Execution," Massachusetts Institute of Technology, Cambridge, Jun. 10, 2002.

Gassend, B.L.P., Physical Random Functions; Thesis, Thesis at the Massachusetts Institute of Technology, pp. 1-89 (Feb. 1, 2003) XP002316843.

Xilinx (Ralf Krueger) "Using High Security Features in Virtex-II Series FPGAs" www.xilinx.com; [printed Jul. 8, 2004].

Lee et al., "A Technique to Build a Secret Key in Integrated Circuits for Identification and Authentication Applications," Massachusetts Institute of Technology (CSAIL) 2004.

Daihyun Lim, "Extracting Secret Keys from Integrated Circuits" Massachusetts Institute of Technology, Cambridge, MA, May 2004.

Milor et al., "Logic Product Speed Evaluation and Forecasting During the Early Phases of Process Technology Development Using Ring Oscillator Data", AMD, Sunnyvale, CA (Abstract).

Ranasinghe et al. "Securityand Privacy Solutions for Low-Cost RFID Systems" IEEE, pp. 337-342 (2004).

Pappu Srinivasa Ravikanth. "Physical One-Way Functions". Massachusetts Institute of Technology, Cambridge, MA. Mar. 2001.

Skoric et al., "Robust Key Extraction from Physical Uncloneable Functions," Proc. Applied Cryptography and Network Security 2005, LNCS 3531, pp. 407-422.

Sean W. Smith et al. "Building a High-Performance, Programmable Secure Coprocessor". IBM T.J. Watson Research Center, Yorktown Heights, NY. Oct. 16, 1998.

(56) References Cited

OTHER PUBLICATIONS

G. Edward Suh, et al., "Design and Implementation of the AEGIS Single-Chip Secure Processor Using Physical Random Functions," In *the proceedings of the 32nd International Symposium on Computer Architecture*, Madison, Wisconsin, Architecture, Jun. 2005, (Memo-483).

Tuyls et al., "Security Analysis of Physical Uncloneable Functions," Proc. 9th Conf. on Financial Cryptography and Data Security, Mar. 2005, LNCS 3570, pp. 141-155.

Tuyls et al., "Information-Theoretic Security Analysis of Physical Uncloneable Functions," Proceedings ISIT 2004 (Chicago), p. 141.

Tuyls, Pim and Lejla Batina, "RFID-Tags for Anti-Counterfeiting," Topics in Cryptography, vol. 3860/2006, No. LNCS3860, (Feb. 13, 2005) XP002532233.

Hon-Sum Wong et al. "Three-Dimensional "Atomistic" Simulation of Discrete Random Dopant Distribution Effects in Sub-0.1 µm MOSFET's".IEDM, 29(2):705-708, 1993.

Bennet Yee, "Using Secure Coprocessors," Carnegie Mellon University, Pittsburg, PA. May 1994.

Arazi, B. "Interleaving Security and Efficiency Considerations in the Design of Inexpensive IC Cards" IEEE Proceedings on Computers and Digital Techniques vol. 141, Issue 5 Publ Date: Sep. 1994. pp. 265-270.

Omura, J.K., Novel Applications of Cryptogrtaphy in Digital Communications, IEEE Comm. Mag., May 1990, pp. 21-29.

Srinivas Devadas et al., "Sythesis of Robust Delay-Fault Testable Circuits: Theory" Massachusetts Institute of Technology, Cambridge, MA Jan. 1992.

Bolotnyy, Leonid, et al. "Physically Unclonable Function-Based Security and Privacy in RFID Systems" *Proceedings of the Fifth Annual IEEE International Conference on Pervasive Computing and Communication* (2007) 8 pages.

\* cited by examiner

AUTHENTICATION WITH PHYSICAL UNCLONABLE FUNCTIONS

CROSS-REFERENCE TO RELATED APPLICATIONS

This application claims the benefit of U.S. Provisional Application No. 60/973,505, titled "Authentication Systems Involving Physically Unclonable Functions," filed Sep. 19, 2007, and U.S. Provisional Application No. 61/018,618, titled "Secure RFID," filed Jan. 2, 2008, which are incorporated herein by reference.

This application is also related to U.S. application Ser. No. 11/273,920, titled "Volatile Device Keys and Applications Thereof," filed Nov. 14, 2005, and published as US2006/0210082A1 on Sep. 21, 2006, which is incorporated herein by reference.

BACKGROUND

This invention relates to authentication with physical unclonable functions.

Physical Unclonable Functions (PUFs) in electronic circuits can be used to distinguish integrated circuits (ICs, "chips") from one another. The ability to distinguish one chip from another using a PUF in hardware (a "Hard PUF") or in a programmable device (a "Soft-PUF") is a potentially valuable way to authenticate ICs. The applications for such authentication are wide ranging and include, among others, anti-counterfeiting, inventory control, multi-factor authentication (to allow access to computer system or on-line computer systems & networks), and, with appropriate control logic used in conjunction with a basic PUF circuit, secret key generation for cryptographic and other security applications. An effective authentication mechanism can be executed in a number of ways, but typically involves the use of digital challenges (strings of 1's and 0's) which, when applied to a typical PUF circuit, yield corresponding digital responses (another string of 1's and 0's) that differ from one integrated circuit to the next. These challenges and their corresponding responses are the challenge-response pairs (CRPs) for that PUF.

SUMMARY

PUFs for authentication can be implemented in a variety of electronic devices including FPGAs, RFIDs, and ASICs. In some implementations, CRPs corresponding to individual PUFs can be created and managed in a database. Later—when the target object with a PUF is intended to be authenticated—a set (or subset) of challenges are applied to each PUF device to authenticate it and thus distinguish it from others. Since any two PUFs have different electrical characteristics—despite otherwise identical electronic circuit layouts—this can be an effective and low-cost mechanism for authentication of electronic components. Authentication is achieved without requiring complex cryptography circuitry implemented on the device. Using simpler circuitry with fewer logic gates also reduces the amount of power required for the device.

In one aspect, in general, a method for authenticating a device using an authentication station is applied to a device that provides a capability to accept a challenge value from the authentication station and return a response value to the challenge value to the authentication station that depends on fabrication characteristics (e.g., semiconductor fabrication characteristics) of the device. The method includes identifying the device, which includes accepting identification data at the authentication station from the device to be authenticated. Authentication data characterizing one or more pairs of challenge and response values associated with the identified device that were previously obtained by a trusted authority in communication with the device is retrieved. This retrieving of the data does not require communication between the authentication station and the trusted authority after identifying the device. A first challenge value is provided from the authentication station to the device, and a first response value is accepted at the authentication station from the device. Whether or not the pair of the first challenge value and the first response value sufficiently match the authentication data is then determined.

Aspects may include one or more of the following.

The pair of the first challenge value and the first response value sufficiently match the authentication data if there is a challenge and response pair of values represented in the data such that the challenge in the data equals the first challenge value and a corresponding response in the data differs from the first response value in fewer than a predetermined maximum number of bit positions.

The device comprises a proximity device, such as an Radio Frequency Identification Device (RFID), and the steps of accepting the identification data, providing the first challenge, and accepting the first response each comprise communicating between the authentication station and the proximity device using a wireless communication protocol. For example, the wireless communication protocol can be compatible with an ISO 14443 standard, and the identification data can represent an Electronic Product Code (EPC) associated with the device.

The authentication station is one of a number of distributed authentication stations associated with the trusted authority, which may be remote to the trusted authority.

Determining the authentication data includes, prior to accepting the identification from the device, accepting data associating each of a plurality of device identifications with a corresponding subset of pairs of challenge and response values obtained by the trusted authority for a device corresponding to the device identification. After identifying the device, the subset of values for the device is accessed according to the accepted identification data.

Determining the authentication data includes accepting an encryption of the authentication data at the authentication station from the device. Prior to identifying the device, decryption information for decrypting the encryption of the data accepted from the device is accepts, for example, from the trusted authority.

The authentication data includes model parameters sufficient to predict a response value for each of a plurality of challenge values. For example, the model parameters comprise delay parameters corresponding to delay elements in the device according to which response values are determined at the device.

The method includes selecting a challenge value at the authentication station and determining a predicted response value for the selected challenge according to the model parameters. Determining whether the pair of the first challenge value and the first response value sufficiently the authentication data includes determining whether the first response value sufficiently matches the predicted response value.

Additional authentication data is determined at the authentication station suitable for further authentication of the device, for example, by another authentication station. This can include generating one or more additional challenge values, providing the challenge values to the device, and accepting corresponding response values from the device. The additional authentication data may be provided to the trusted authority, or an encryption of the additional authentication data may be provided to the device, or passed to another authentication station.

The method further includes determining the first challenge value as a preceding value to a second challenge value in a deterministic sequence associated with the device and determining a second response value from the accepted first response value. Determining whether the pair of the first challenge value and the first response value sufficiently match according to the authentication data includes determining whether the pair of the second challenge value and the second response value sufficiently match the authentication data.

In another aspect, in general, multiple challenges are used for any object/device to improve authentication error rates.

In another aspect, in general, an ID combined with CRPs is used for an object/device to increase the performance, extend the capabilities, and/or facilitate more highly scalable CRP authentication systems In another aspect, in general, multiple databases of CRPs, which may be shared or may be independent of one another, are used to enhance the flexibility of the authentication process across multiple users, to allow $3^{rd}$ party mediation, and/or to provide a mechanism for recovery in the event of a security breach around the information in any database of CRPs In another aspect, in general, a device security circuit includes circuitry for combining a set of outputs, each output being determined by a corresponding control input for selecting physical characteristics of the device upon which the output depends; and using the combination of the plurality of outputs for a security function associated with the device. The device may in some examples include a set of separate circuits, each for generating a different one of the set of outputs. In some examples, a same circuit is used for generating multiple of the set of outputs. The circuitry for combining the set of outputs may include circuitry implementing an exclusive OR (XOR) operation. The device may also include circuitry for generating the control inputs from challenges values provided to the device. For example, this circuitry f includes a linear feedback shift register (LFSR).

In another aspect, in general, a method for authenticating devices that each provide a capability to accept a challenge value and return a response value to the challenge value that depends on fabrication characteristics of the device includes enrolling each of the devices. The enrolling of each device includes providing a plurality of challenge values to the device, accepting a corresponding plurality of response values from the device, computing model parameters from the plurality of challenge values and corresponding plurality of response values. The model parameters are sufficient to predict response values corresponding to challenge values provided to the device. The model parameters are stored for subsequent use for authenticating the device.

Aspects can include one or more of the following.

Storing the model parameters includes storing the model parameters in association with an identification of the device.

Storing the model parameters includes providing an encryption of the model parameters to the device for storage on the device.

The method includes authenticating one of the devices, including retrieving the model parameters for the device, providing a first challenge value to the device, accepting a first response value from the device, and determining whether the pair of the first challenge value and the first response value sufficiently match according to the model parameters.

After accepting the response values for computing the model parameters from the device, the device is inhibited from subsequently providing response values suitable for subsequent computing of model parameters for the device. For example, this inhibiting includes physically modifying the device (e.g., burning fuses), or deleting required data (e.g., cryptographic keys).

Computing the model parameters includes computing parameters corresponding to circuit parameters of circuit elements of the device used to compute a response value from a challenge value.

In another aspect, in general, a security device includes a communication interface for accepting a challenge value from an authentication station and providing a corresponding response value to the authentication station, a sequencer for determining a sequence of configuration values based on the challenge value, and a response circuit whose functional characteristics depend on fabrication characteristics of the circuit that are substantially unique to the device, said circuit including configuration inputs coupled to the output of the sequencer such that an output of the response depends on a the configuration value and the fabrication characteristics. The device is configured to accept the challenge value and generate the corresponding response value according to sequential configurations of the response circuit configured according to outputs of the sequencer. The sequencer may include a linear feedback shift register. The response circuit may include a set of delay elements configurable according to the configuration input to form one or more delay paths through the response circuit.

Approaches described herein may address one or more of the following. First, PUFs can be electrically "noisy." Unless error correction is applied to the output of the PUF, each time a PUF is queried even with the same challenge, it could yield slightly different results. This phenomenon is similar to the way a human biometric (e.g., fingerprint) measurement can yield slightly different results from one measurement to another. In the case of human biometrics, the differences might be due to inaccuracies in the measurement system, smudges on contact points, etc. In the case of PUFs, the cause of noise could be temperature, voltage, radiation, or aging, which are known to change the electrical and functional characteristics of circuits. In the case of a PUF, this could cause the responses to the same challenge to vary slightly from one measurement to the next.

Second, as the number of devices to be authenticated grows in size, the difficulty of managing the database (especially indexing and accessing the data after it is populated) increases if only CRPs are stored. Also, additional complexity is added if a user of the system merely wants to simply identify the device/component/product (such as for track & trace inventory control purposes). If the user wants to merely identify the component using only CRPs, the user may be required to select a challenge to apply to the device but without any guidance about which CRP is supposed to correspond to the specific device. Of course, it is possible to do this with the same pre-challenge applied to all devices, but doing so adds an extra processing step, slows down the processing, and greatly magnifies the indexing hurdle.

Third, there are circumstances where having a single "golden" repository of CRPs for all authentication events associated with PUF-equipped devices might complicate the authentication process. In the case where all parties must have to access to a single database, excessive network latency, the absence of network access altogether, or concern about the effects of a catastrophic failure of the database (such as could occur if the security around a single database might be broken by an attacker), a single database is less than ideal. Furthermore, in some cases, different parties may want their own CRP databases for objects to be authenticated and they many not want to share or store their own CRPs in a central database.

In another aspect, in general, a secure radio frequency identification device uses a combination of outputs from multiple (e.g., 2, 3 or more) "PUF" circuits, for instance, combined using an XOR operator. The outputs of the PUF circuits can each correspond to the output of a different PUF circuit, or can correspond to sequentially evaluated outputs of a same PUF circuit, for example, using different control inputs that cause the outputs to depend on different physical characteristics.

In some examples, each PUF circuit is controlled according to the output of a linear feedback shift register (LFSR), for example, with each LFSR implementing a different polynomial output and using the sample or different inputs (i.e., challenges).

Advantages of one or more aspects can include increasing the difficulty in modeling the PUF circuit. For example, using an XOR of two different PUFs can greatly increase the difficulty of modeling the physical characteristics (e.g., delays) in the PUFs. As another example, using LFSR for determining the control inputs to the PUFs further makes modeling difficult by making it difficult for an adversary to select particular characteristics of a PUF to contribute to the output of the PUF.

Other features and advantages of the invention are apparent from the following description, and from the claims.

DESCRIPTION

Figure 1:
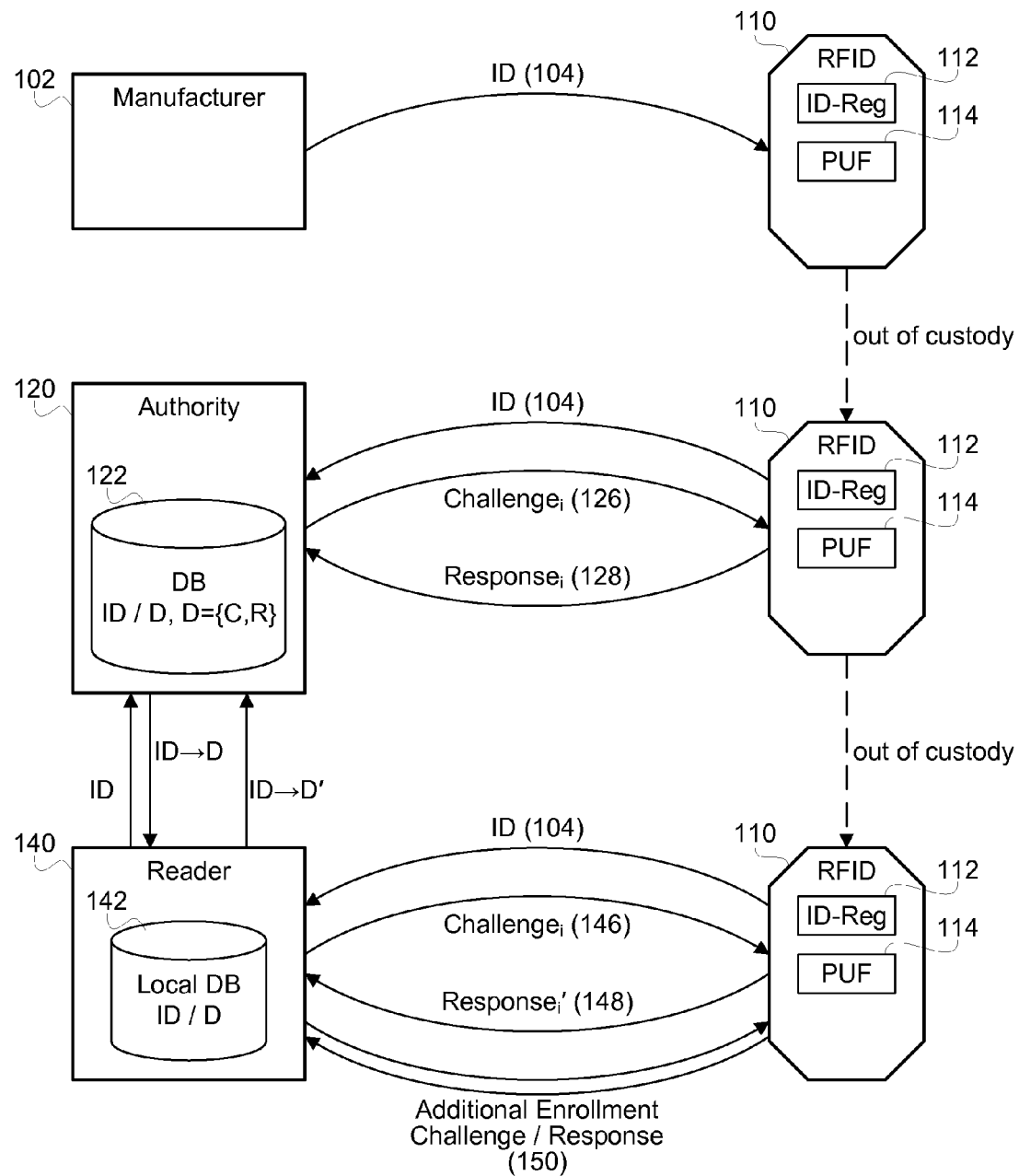
FIG. 1 is a diagram illustrating a PUF-based RFID authentication system.

Referring to FIG. 1, an example of an authentication system uses Physical Unclonable Function (PUF) circuits for authentication of proximity devices, such as RFIDs (Radio Frequency Identification Devices). In particular, the authentication system extends the identification function of conventional RFIDs to provide an authentication function, which prevents "cloning" of RFIDs, or makes such cloning very complex. It should be understood that the techniques described below are not limited to use with RFIDs or proximity devices. Other examples of authentication systems address different types of devices that make use of integrated PUFs as a basis for the authentication.

In an example scenario, RFIDs 110 are provided in an unprogrammed state to a manufacturer 102, such as a manufacturer of a luxury consumer item. The manufacturer affixes an RFID to a manufactured item to serve as the basis of identification and authentication as the item moves through the supply chain to the ultimate consumer. For example, the manufacturer may store and identification number (ID) 104 on the RFID, such as an EPC (Electronic Product Code). In other examples, each RFID is constructed with a permanent unique ID, which may later be affiliated with an EPC or batch number as desired.

An authority 120, which is an initial party that establishes the authenticity of the item to which an RFID 110 is attached, makes use of the PUF 114 on the RFID to determine information that will subsequently be used for authentication of the RFID. Note that the authority 120 may be the same party as the original manufacturer 102. Very generally, the approach to authentication relies on an enrollment phase in which the authority provides a set of challenges 126 to the RFID, which are used by the PUF 114 on the device to generate corresponding responses 128, which are passed back to the authority 120. Each challenge and its associated response form a challenge response pair (CRP). The set of challenges forms a very small subset of all the possible challenges that could be sent, and therefore can be considered a random selection. For example, using 64-bit challenges, there are $2^{64}$ possible challenges, and the number of challenges uses during enrollment would typically be a very small fraction of this number, for example, hundreds of 64-bit challenges. The authority securely stores the small subset of CRPs, which can then be used for authentication.

At some future time, in general after the RFID has been out of custody of the authority or other trusted parties, the RFID is authenticated. This authentication involves providing one challenge (or possibly a small set) to the device from an authentication station (such as a portable RFID reader), receiving a corresponding response, and determining whether the response is suitably consistent with the responses provided during the initial enrollment. For example, a random selection of a challenge from the subset that was used during enrollment is provided to the RFID, and the response is compared to the enrolled response according to a number of bit-level differences. For example, in some examples, an authentication time response and an enrollment time response is declared if there are less than 12 bit differences out of 128.

Examples of authentication systems that use the general approach described above make use of one or more of specific techniques, and families of techniques, described below to improve the performance and extend the capabilities of CRP authentication systems in general, as well as in particular CRP authentication systems built using PUFs embedded in electronic circuits.

In some embodiments, to reduce Type 1 (false positive, i.e., declaring a cloned device as authentic) and Type 2 (false negative, i.e., declaring a true device as not being authentic) errors caused by "noise" (e.g., bit errors) in the PUF circuit, it is possible to apply multiple challenges to a PUF-equipped integrated circuit/device. Statistical theory suggests that applying multiple challenges to the same object can reduce authentication error rates. This can be done a number of ways (with similar impacts) including, among others, (a) applying two or more challenges in the same read/challenge/response cycle and concatenating the resulting responses (thus effectively increasing the bit-length of the challenge rather than requiring a separate authentication step for each challenge), and (b) immediately applying a $2^{nd}$, $3^{rd}$, or $n^{th}$ number of challenges in sequential order if a product appears to not to be authentic after the first authentication attempt. The first of these techniques can be performed in hardware or firmware without burdening the authentication system. The second of these techniques has the advantage that it can be applied selectively, only to those PUF objects which were found previously to be suspect/non-authentic. By using multiple challenges and responses for a given object, Type 1 and Type 2 errors can be reduced, assuming that challenges and underlying responses for any given PUF are statistically independent of one another. Furthermore, even if the underlying challenges & responses are not perfectly independent, statistically speaking, it can be shown that Type 1 and Type 2 errors are reduced if there is some measure of randomness in the underlying CRP results from one device to the next.

In some embodiments, each RFID does not have a unique ID. Instead, an identifier pre-challenge is issued to the device and the response is used as an ID. If multiple devices are known to return the same response to the pre-challenge, additional challenges may be necessary to uniquely identify the device. In some embodiments, to increase the efficiency of the authentication process and to lessen the complexity of the database handling issues, the use of a non-PUF "identifier" such as a unique item number (which could be assigned in any order—random, serialized, or other) or other single unique identifier ("ID") in combination with the CRP for a PUF-equipped object adds significant advantages to the system. Such a number could be stored in non-volatile random access memory (the most common form of storage of such numbers) or generated from the circuit by other means. By associating what could be essentially a "public" ID (e.g., electronic product global code, EPC) with a set of underlying CRPs for that device, the process of authentication is greatly simplified.

Referring to FIG. 1, an authentication procedure in this case reads/scans the ID 104 and associates specific CRPs that are stored for that object ID, e.g., in a database 122. Using the ID, the database 122 can be sorted quickly to find the CRPs that should correspond to that item when later tested in the authentication process. Using an ID, a pre-challenge is unnecessary to find the object in the database. Furthermore, not only can the database itself be organized and accessed more efficiently with the use of an ID, but information about the item that is not central to the authentication, but rather to other things such as basic inventory control, could be made more readily available to users. In some example usage models, including use in inventory control or track & trace systems, such an ID could be public.

In some embodiments, to provide greater flexibility in data handling, and to allow multiple parties to each use the same authentication system, and furthermore to provide a recovery mechanism should the security of any database of authentication CRPs be compromised, it is possible to create multiple databases of CRPs and furthermore, to associate separate or even disparate CRP databases across multiple users. Under one such model, any party in possession of an authenticatable PUF-equipped device could create their own database of CRPs associated with that object. If the physical entropy of the PUF is sufficiently large (defined mainly by the number of independent bits that can be generated by a PUF), the likelihood that any two parties would have the same CRP database for the same object can be, by design, made arbitrarily very low, statistically speaking. Each database is created by acquiring distinct CRP sets through a sequence of challenges issued to an authenticated device. If all parties cannot agree to share the same database, each party can at a minimum manage their own information independently. A third party, such as a central repository or service provider, who either has their own CRPs for such objects/devices or, by agreement amongst the parties themselves, can arbitrate between the parties and attest that, for example, an object held by Party A is the same (or not, as the case may be) as another object at another time/place in the possession of Party B. Such parties A and B, in this example, need never share their respective CRPs for the object in question, should they not wish to. Yet a chain of trust amongst all parties can be achieved. Furthermore, to provide a recovery mechanism should the security of any database of authentication CRPs be compromised, it is possible to create multiple databases of CRPs.

Referring to FIG. 1, in some implementations, the initial set of CRPs acquired by the authority 120 at initial enrollment is stored in a main database 122. All or some known challenge response pairs are then securely distributed to remote devices, which may not necessarily maintain communication with the main database after they receive the data. For example, the remote device can be a handheld RFID reader 140, which stores the CRPs in a local database 142. If the local database 142 has at least one CRP for an item to be authenticated, the device 140 can perform the authentication. From time to time, or on demand from the remote device, further CRPs can be distributed from the main database 122 to the remote device 140 to replenish the used CRPs, which should not be reused for security reasons if there is any possibility that the response was intercepted. A reader 140 can also refresh its local database 142 directly from an authenticated device 110 by issuing additional challenges and recording each response 150, forming new CRPs. However, if this procedure is conducted where the communications can be intercepted, it is possible for a counterfeiter to replay the newly acquired CRPs.

In some implementations, when a device 110 has been authenticated, a reader 140 can refresh its local database 142 directly from the authenticated device. The reader 140 issues a random challenge and the item itself provides the new response 150. In some implementations, the new challenges are provided by the remote device. For example, with each use of a CRP by the remote device to authenticate an item, the item provides a further CRP that can be used later to reauthenticate the item even if it is in an untrusted environment during the intervening time. The newly generated CRP can be uploaded to a central database 122, and then distributed to yet other remote devices for later authentication. In some implementations, the protocol between the reader and the item is such that for each authentication, the item provides a new CRP (or a response to a second challenge provided from the reader) that can be later used, thereby not requiring a separate interaction to be initiated to obtain the new CRP.

Referring again to FIG. 1, in some implementations, an RFID device 110 has a PUF circuit 114 and an identifier (ID) 104, for example, correlated to an electronic product code (EPC). In some implementations the ID 104 is stored in non-volatile memory (ID-Reg) 112 by the manufacturer 102. A registration authority 120 retrieves the ID 104 from the device and supplies the PUF circuit 114 with a number of challenges (e.g., challenge$_i$ 126). The authority records each response (e.g., response$_i$ 128) for each challenge, creating a data set D representative of the discovered challenge/response pairs (CRP). In some examples, the data set D explicitly represents the challenge-response pairs, for example, as a list or in a database. The number of CRP for any particular RFID in D is not comprehensive and may represent only a small fraction of possible CRPs for the circuit. The authority stores data set D in association with the ID of the device, for example, in a database 122 indexed by device identifiers.

At a later time, generally after the RFID has been out of custody of trusted parties, the device is authenticated using a reader 140, such as a portable RFID reader. In some examples, the reader has trusted communication access to the authority or the database 122 created by the authority. In other examples, the reader can be disconnected from the authority at the time it authenticates the RFID.

In some examples, the reader retrieves the ID 104 from the device 110, determines challenge-response data D associated with ID, and issues a challenge 146 to the circuit selected from the set of challenge/response pairs represented in D. The data D for the set of CRPs associated with an UD is determined, for example, by querying a database using ID. The database may be remote (e.g., a database 122 controlled or trusted by the registration authority) or local (e.g., a database 142 contained within the reader itself). For example, in examples in which a reader will be disconnected from the authority during authentication, a portion of the main database 122 is transferred to the reader 140 and stored in local database 142. The portion of the database may be selected, for example, according to a prior request for data according to the items expected to need authentication, such as the data corresponding to lots of items that are in transit in a supply chain. The data is maintained securely in the reader, for example, using tamper-proof encryption, to prevent disclosure of the data.

In general, the challenge 146 is selected at the reader for a single use. Selection may be can be deterministic (e.g., sequential selection through an unsorted list) or random (i.e., randomly selected from the CRPs represented in D). Each challenge selection is expected to be unique, even if randomly selected since each challenge is selected from a pool of $2^N$ possible challenges (N is the number of bits in the challenge).

The circuit's response R' 148, which is generated in the device using the PUF and sent back to the reader, is compared by the reader against the anticipated response R from D. If the response R' is sufficiently similar to anticipated response R, then the circuit has been authenticated. While an exact match is ideal, some allotment is made for bit-errors up to a threshold. If the response R' matches R with fewer bit-errors than the threshold, it can be considered sufficiently similar for authentication. In some embodiments, there is a distinct difference between an invalid response (e.g., with roughly 64 erroneous bits in a 128-bit response) and a valid response (e.g., with roughly 12 to 16 erroneous bits in a 128-bit response). Probabilities for false-positives (identifying an imposter device as authentic) and false-negatives (rejecting a valid device) can be balanced and traded-off against each other by setting the appropriate authentication code distance threshold. Other methods of determining sufficient similarity are also possible, for example, weighting different bit errors differently. If R' is not sufficiently similar, the device may be rejected, additional challenges may be issued, or other verification procedures may be invoked.

In some embodiments, the reader maintains a local database DL. The local database may be initially or periodically acquired from the registration authority, may accompany a batch of RFID devices in an encrypted form (e.g., on a DVD packaged with a lot of items marked with the RFID devices), or may be embedded in an encrypted form on the RFID devices themselves. Once a circuit has been authenticated, DL may be expanded by the reader by issuing additional challenges and recording the responses. Additionally or alternatively, these additional enrollment CRPs can be sent back to the authority 120 for addition to the central database 120, or sent to another reader for authentication further along the supply chain. Additional enrollment allows the number of known CRPs to be refreshed, minimizing the number of CRPs known at any given location or time.

Figure 2:
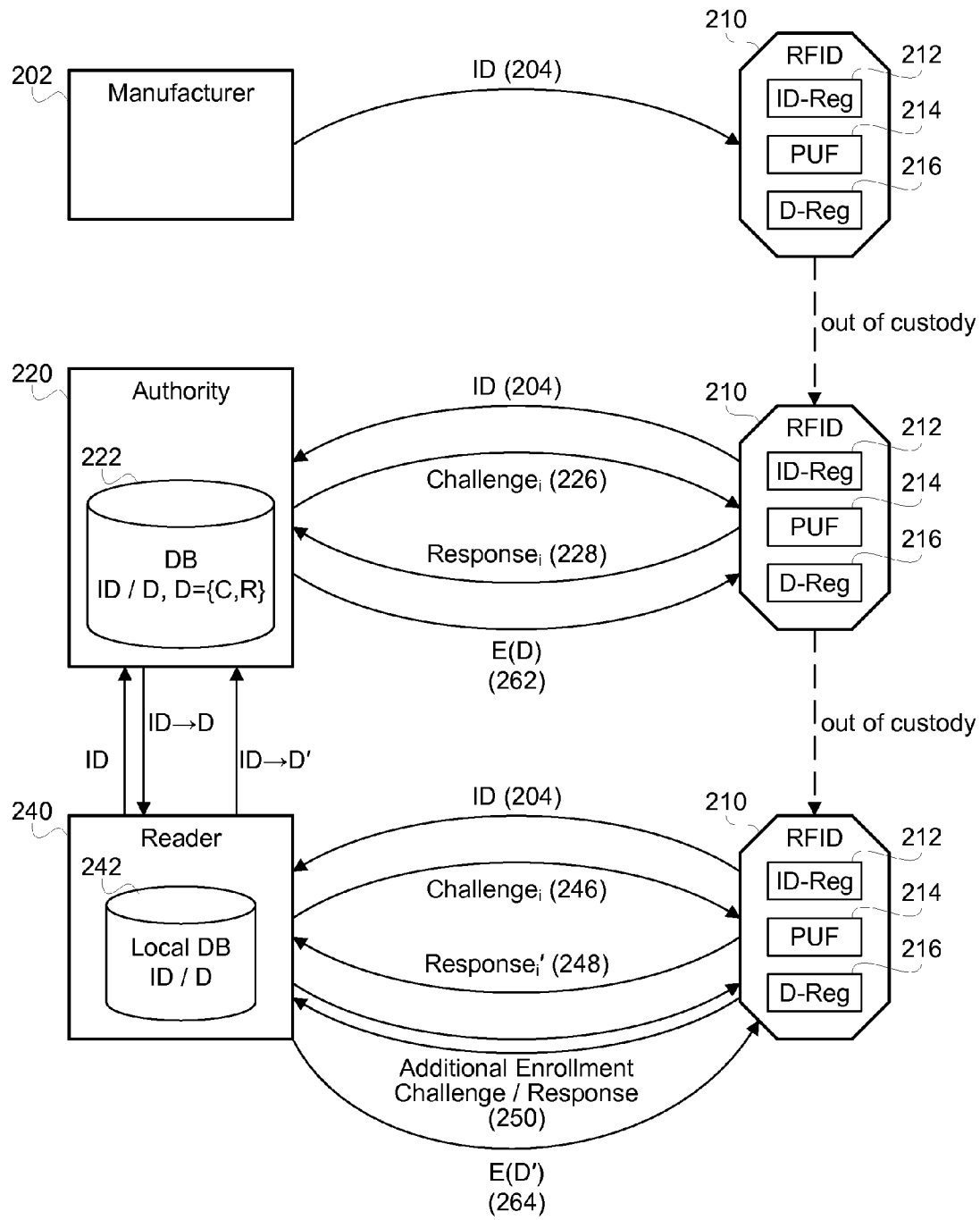
FIG. 2 is a diagram illustrating a PUF-based RFID authentication system.

Referring to FIG. 2, in some embodiments as introduced above, during the enrollment phase, the authority 220 determines the CRP data D based on the challenges 226 provided to the device 210 and corresponding responses 228 received from the device. The authority then encrypts the data D (or more typically a subset of the data corresponding to a subset of the challenge response pairs that were enrolled) to form E(D). For example, E(D) can include independent encryption of each of the challenge-response pairs used during the enrollment. The authority then passes the encrypted CRP data to the device (262) where it is stored in an encrypted form E(D) with the device itself 210, for example, in memory 216. E(D) may be encrypted with a public/private key-pair scheme, with a shared-key scheme, or with any other scheme. Note that data decryption functionality in the device 210 is not required. Multiple devices 210 may use the same decryption key, for example, grouped together by company, by recipient, by batch, or by any other collection-scope of circuits. The reader then only needs the decryption keys relevant to the anticipated devices. In some examples, the encryption key is specific to each device, for example, being determined from a key common to a group of devices and the ID 204 of the device.

At the time of authentication, the RFID device 210 provides the reader 240 with the ID and with E(D) for the device, for example, based on a request from the reader. In some implementations, supplying power to the RFID causes it to transmit its ID and E(D). Note that in the scenario being described, the reader does not have to be connected to a central authority at the time of authentication or even after enrollment of the device by the central authority, as long as it has the key to decrypt the data from the device. The reader decrypts D and selects a challenge, which is then submitted to the circuit. Selecting a challenge can be deterministic (e.g., sequential) or random (i.e., randomly selected from the CRPs in D). In some examples, the reader makes a selection of the challenge (or a challenge index) and requests only the selected encrypted data from the reader, thereby avoiding the need to send the entire on-device database. In some embodiments, the reader performs a further enrollment by issuing a new challenge and receiving a corresponding response, and then creates a local DL for subsequent authentication or re-storing on the circuit.

When storing D on the device, there could in principle be a loss of connection between verifying that the PUF circuit is valid and verifying that the ID is valid. This can be corrected by linking the ID into the authentication process. In some embodiments, the device ID is used within the PUF circuit as part of the challenge. For example, the challenge from the reader is combined with the internal device ID before generating the response. In some embodiments, the device ID is used as part of the encryption scheme for encrypting E(D). For example, the key for decrypting E(D) is a function of a secret key known to the reader and the ID. In some embodiments, the device ID can be included in the database D prior to encryption, so it can be used by the reader to verify the device ID; this serves as a conventional message authentication code for the device ID, ensuring that the encrypted database is tied to the device with a particular ID.

Figure 3:
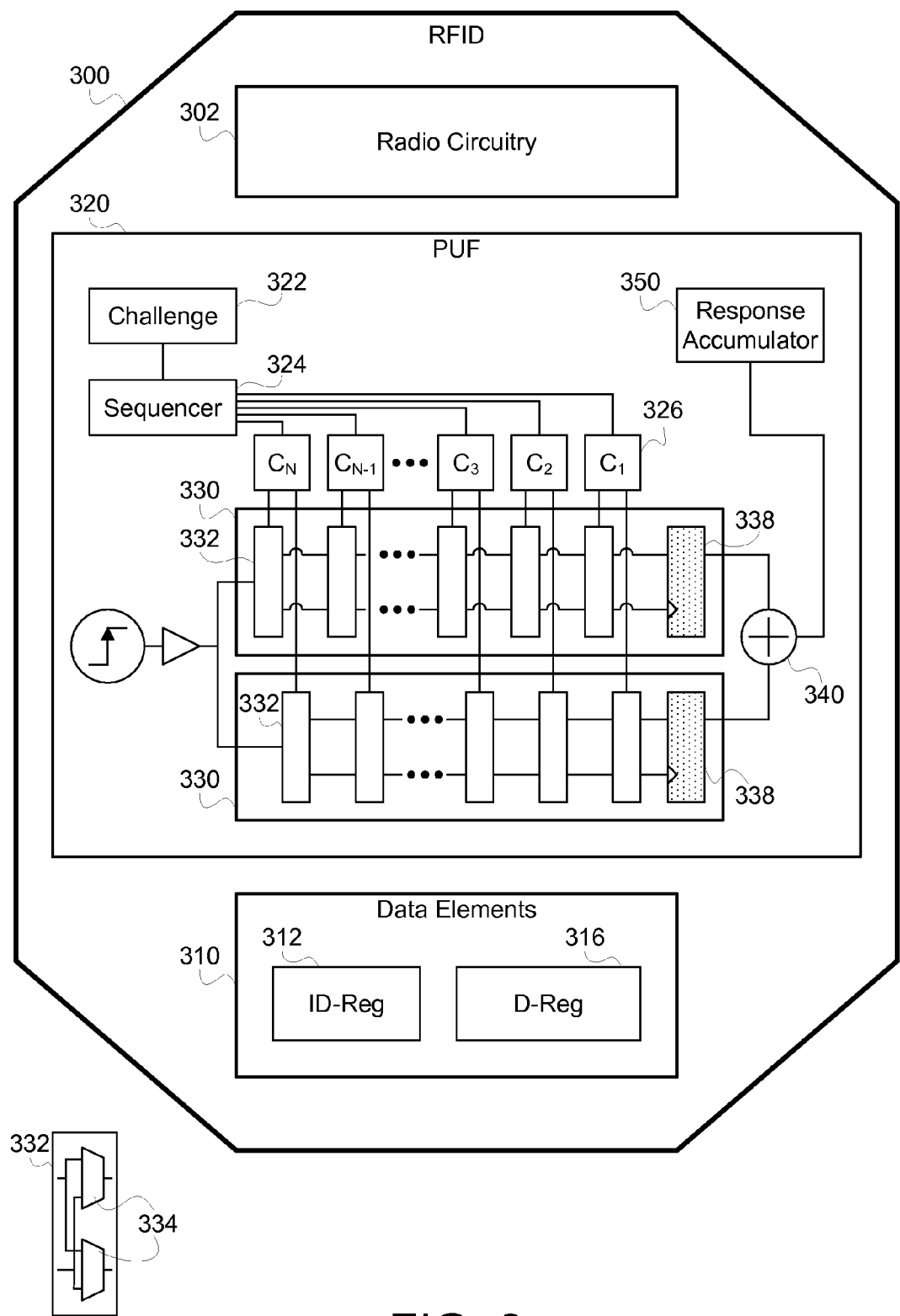
FIG. 3 is a diagram illustrating a PUF-based RFID.

Referring to FIG. 3, a block diagram of an example RFID 300 includes radio circuitry 302 and data elements 310, for example, storage for an ID 312 and storage for E(D) 316. In some embodiments, a PUF 320 used in an RFID 300 includes two delay-based elements 330, each of which generates a single bit from a set of delay stages 332 terminated by an arbiter 338 that compares the delay along two paths selected according to an N-bit challenge 322. Each delay stage 332 is configured by a challenge value 326. For example, in some embodiments each delay stage 332 is a pair of multiplexers 334. The challenge value 326 configures each multiplexer 334 to pass a particular input. Other configuration of delay stages 332 can also be used.

The two bits produced by the two delay-based elements 330 are combined 340, preferably in a nonlinear manner, for example using an XOR logic gate, to produce one bit of the M-bit response 350. The process is repeated for M iterations to generate a complete M-bit response. In some embodiments, each iteration uses a subsequent challenge configuration generated by a sequencer 324, for example a linear feedback shift register (LFSR). In some embodiments, more than two delay-based elements are used, whose outputs are collectively XORed (sum modulo 2) or otherwise combined in a nonlinear manner, for example, according to a hash element. In some embodiments, only one delay-based element is used. Multiple passes are generated by extended use of the sequencer or use of multiple sequencers. For example, a first pass through the delay-based element is controlled by a first challenge from a first sequencer. A second pass is then controlled by a second challenge from a second sequencer. The two passes are then combined, for example using an XOR logic gate. Any combination of one or more sequencers and one or more delay-based elements can be used to generate challenge response pairs.

Figure 4:
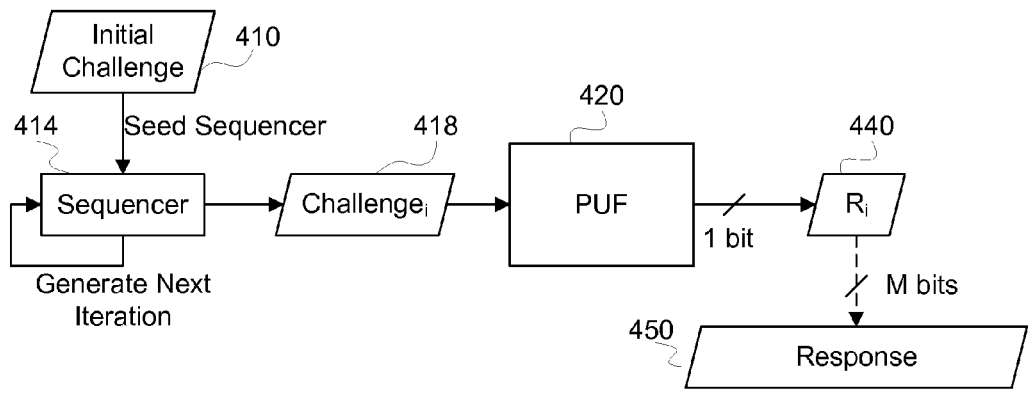
FIG. 4 is a flowchart illustrating PUF generation of a response from a challenge.
Figure 5:
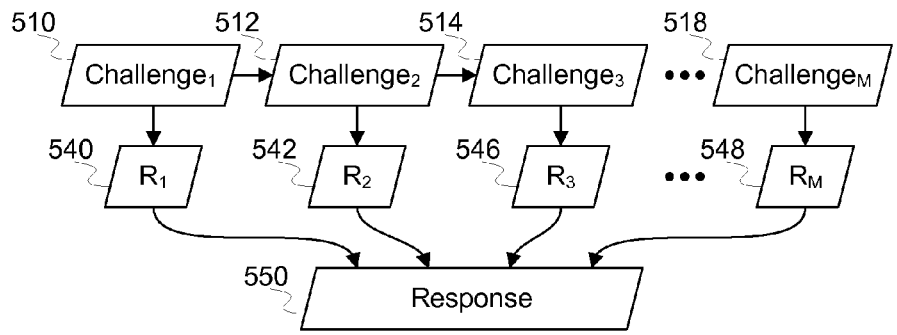
FIG. 5 is a diagram illustrating response bits aggregated into a response.

Referring to FIG. 4, in some embodiments, the initial challenge 410 is used to seed a deterministic sequencer 414, for example, a LFSR. Each response bit $R_i$ 440 is generated by the PUF circuit 420 configured by a challenge$_i$ 418. Each subsequent challenge$_i$ 418 is generated by the deterministic sequencer 414. Each subsequent challenge$_i$ 418 may be generated by one or more iterations of the sequencer 414, depending on the type of sequencer and the number of new bits desired in each challenge 418. This process is repeated M times in order to generate an M-bit response 450. This process is illustrated in FIG. 5 where M challenges (510, 512, 514, . . . 518) are used to generate M response bits (540, 542, 544, . . . 548) which are combined to form an M-bit response 550.

In some embodiments, as illustrated in FIG. 3, the PUF circuit incorporates a sequencer 324, for example, a LFSR. The sequencer accepts an N-bit challenge 322 (i.e., the challenge sent from the reader or from the authority to the device) and generates a deterministic sequence of subsequent N-bit challenges. Each response bit from the PUF circuit is generated in response to the initial challenge and each subsequent challenge in the sequence. For example, each challenge bit is used as a configuration control 326 for each delay stage 332 of a delay-based element 330.

Referring to FIG. 2, in some embodiments, a small number of CRPs may be stored 262 in an encrypted form E(D) with the device 210, for example, in memory 216. As before, E(D) may be encrypted with a public/private key-pair scheme, with a shared-key scheme, or with any other scheme. In some embodiments, the encryption key is a function of the device ID 204 and a private key within the reader.

The reader 240 retrieves the device ID 204 and the encrypted data E(D) from the device 210. The data D is decrypted and a challenge C selected. The reader randomly selects an offset Δ, and then computes a challenge precursor $C_p$ such that $C_p$ occurs in the deterministic sequence Δ iterations prior to C according to the sequencer implemented in the device. The reader then issues challenge $C_p$ to the device; the challenge C is thus never sent in the clear in the communication between the reader and the device. The PUF circuit generates a response of least Δ+M bits, where M is the number of bits in the response. For example, the device can be configured to generate a 2M bit response, and A, which is unknown to the device, can be selected by the reader to be in the range 0 to M−1. The desired response R' for the challenge C is expected at A bits into the device response.

Figure 6:
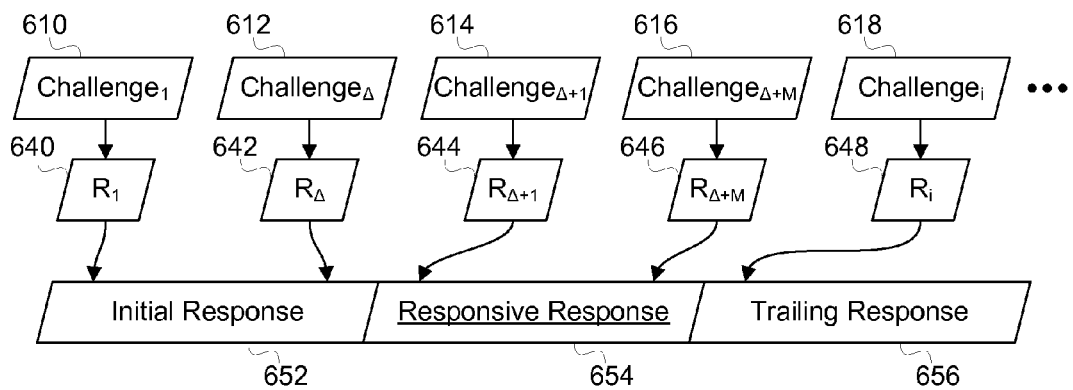
FIG. 6 is a diagram illustrating superfluous response bits aggregated into a long response with embedded responsive response.

For example, referring to FIG. 6, E(D) includes a CRP for a challenge 614 and response 654. The reader decrypts E(D) and determines a precursor challenge $C_P$ and issues the challenge $C_P$ to the device. The device produces response bit $R_1$ 640 for configuration based on $C_P \rightarrow$challenge$_i$ 610. The device then produces response bits for subsequent challenges in the deterministic sequence, e.g., Challenge$_A$ 612 leads to bit $R_A$ 642. The initial response 652 made up of initial response bits $R_1$ 640 to $R_A$ 642 is received by the reader, but not tested as the sought response. After A initial response bits are received, the incoming bits make up the response 654 responsive to the desired challenge. That is, challenge$_{A+1}$ 614 through challenge$_{A+M}$ 616 leads to response bits $R_{A+1}$ 644 through $R_{A+M}$ 646, which make up the responsive response 654. The device does not know A and thus will continue generating subsequent challenges 618 and response bits 648 for a trailing response 656, which is ignored by the reader. The device may generate any number of response bits, as long as there are at least Δ+M bits.

The reader compares R' to the anticipated R from the decoded CRP and determines if R' is sufficiently close to R for authentication. In this manner the sought response is buried in a response stream at a location unknown outside the reader.

In a number of the techniques described above, the data D that represents enrolled challenge-response pairs does so explicitly, for example, as a list of the binary challenges and received responses. In some embodiments, rather than (or in addition to) explicitly storing such binary pairs, data that allows prediction of responses to additional challenges is determined by the authority and included in the data. For example, a numerical model of the PUF on a RFID can be used to determine the predicted responses. Note however, that the PUF is designed to prevent (or make very difficult) such model building by unauthorized parties.

In some embodiments, a PUF is designed with additional output connections. These connections expose internal workings of the circuit sufficient to generate a model of the PUF circuit. After such a model is generated, the additional output connections are destroyed or made inaccessible. Examples include the use of independent encryption keys or fuses that can be overloaded to destroy the connection.

Figure 7:
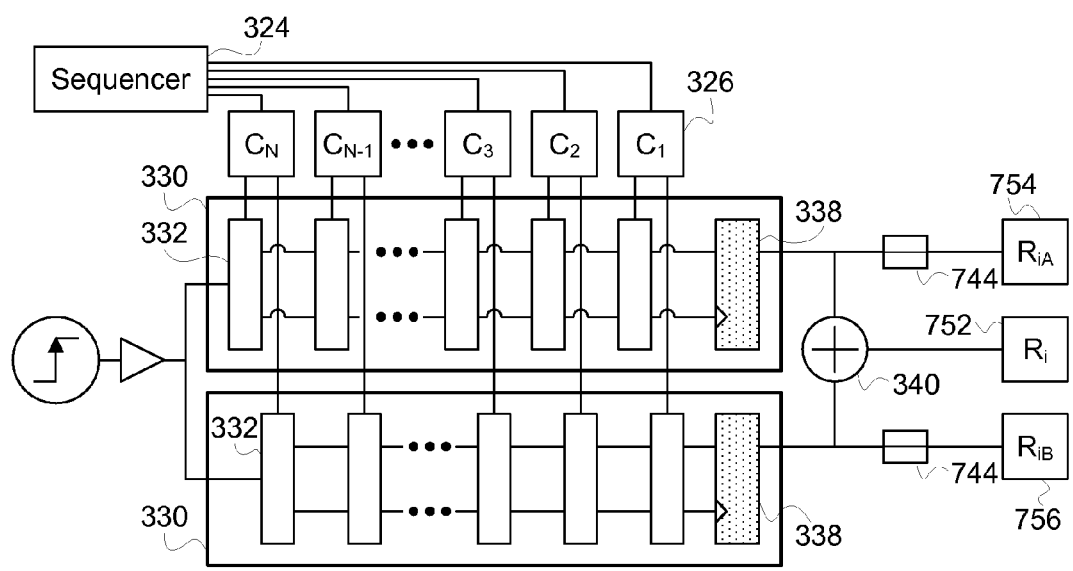
FIG. 7 is a diagram illustrating a PUF with additional output circuitry for modeling.

Referring to FIG. 7, as an example of additional connections, the PUF circuit has three output bits: $R_{iA}$ 754, $R_{iB}$ 756, and $R_i$ 752. The output $R_i$ 752 is used to form the response and is formed as a combination of $R_{iA}$ 754 and $R_{iB}$ 756, for example using an XOR logic gate. $R_{iA}$ 754 and $R_{iB}$ 756 are therefore only used as additional outputs for generating a model. That is, the authority provides a challenge to the device, and the device provides in return the sequence of bits from each of the delay-based elements prior to the XOR. These raw responses, e.g., $R_{iA}$ 754 and $R_{iB}$ 756, are then used by the authority to build a model that predicts the bit output of each of the delay-based elements in response to an arbitrary challenge. After enrollment, the PUF is modified to prevent direct output of the raw outputs without the XOR. For example, a fuse 744 is placed in line to each additional output, $R_{iA}$ 754 and $R_{iB}$ 756. Once the model is complete, each fuse 744 is overloaded and destroyed, severing the output connection. The XOR step, or other forms of non-linear combination of the outputs of the PUF elements, inhibits modeling by later unauthorized parties.

In some examples, the circuit model is encrypted as E(DM) and stored on the device. A reader then receives from the device both the ID and E(DM). The reader, equipped with a decryption key for E(DM), determines the circuit model DM. The reader generates any random challenge, issues the challenge to the PUF circuit, receives circuit response R', determines the expected response R using the circuit model DM, and compares R' to R. If R is sufficiently close to R', the circuit is authenticated. In some embodiments, the circuit incorporates the ID into the challenge. In some embodiments, the encryption scheme for E(DM) incorporates the ID.

As illustrated in FIG. 3, an implementation of a PUF circuit uses a couple of nearly identical signal traces driven from a common source, routed through a chain of swapping multiplexer pairs. A challenge word controls the multiplexers and the output is determined at a race condition arbiter at the end of the multiplexer chain. Natural variations in the manufacturing process yield unpredictable propagation delays of signal paths in the multiplexers. Thus, otherwise identical devices produce unique timing signatures, causing the arbiter to output a unique bit per each unique challenge. In some embodiments, multiple chains are used and the results combined to form the PUF output. Multi-bit responses are generated by concatenating the arbiter output bits for deterministic sequences derived from a challenge. This type of circuit can be modeled in hardware or software in a deterministic manner. A perfect model produces an output practically indistinguishable from the real PUF circuit for any given challenge. For use as an embedded encrypted model, it helps to have a model that is easy to build, requires minimal components or relatively simple code, and needs only a small volume of information about the device modeled (e.g., real challenge/response pairs).

An N-bit long multiplexer PUF circuit can be abstracted into a chain of N polarity switchs and N+1 differential delay blocks. Each delay block holds a signed numeric value $\delta_n$ (n=0 . . . N) characterizing the relative contribution of the multiplexer stage to the PUF output, with the $\delta_0$ element representing bias unrelated to challenges. Challenge bits $c_n$ control the polarity switches $p_n$ at each stage:

$$p_n = (1 == c_n)?(+1):(-1)$$

An equivalent of PUF output bias for a given challenge is computed by applying the challenge to the switches and then accumulating the delays, with the polarity switch each stage conditionally negating the sum value from previous stages:

$$\text{bias} = (\ldots((\delta_N * p_N + \delta_{N-1}) * p_{N-1} + \delta_{N-2}) \ldots + \delta_2) * p_2 + \delta_1) * p_1 + \delta_0$$

The PUF arbiter operation can be approximated as examining the sign of the output bias; thus the output bit r=(bias>=0).

In one approach to modeling a particular PUF circuit, N+1 values of $\delta_n$ unique for the circuit are determined by iterative approximation. Initially, all $\delta_n$ values are set to 0. For each challenge $C_k$ (an array of $c_{n,k}$ bits of length N) the model outputs a bias $b_k$ and the corresponding model result $r_k$. For the corresponding challenge, the device actually returns the bit value $a_k$. Then a back-propagation of a training bias is incremented $t_k$ through the array of $\delta_n$ values, conditionally negated by the polarity $p_n$ at each stage. In cases when the model agrees with the PUF device ($a_k == r_k$), set the training bias increment so that it reinforces the current overall bias:

$$t_{k+} = [(1 == a_k)?(+1):(-1)]$$

In cases when the model disagrees with the PUF device ($a_k \neq r_k$), set the training bias increment so that it corrects all $\delta_n$ values equally to produce the desired result:

$$t_{k-} = [(1 == a_k)?(+1):(-1)] \frac{-b_k}{N+1}$$

Then apply the training bias increment ($t_k$) to each $\delta_n$:

$$\delta_0 = \delta_0 + t_k$$

$$\delta_1 = \delta_1 + t_k * p_1$$

$$\delta_2 = \delta_2 + t_k * p_1 * p_2$$

$\ldots$ $$\delta_N = \delta_N + t_k * p_1 * p_2 * \ldots * p_{N-1} * p_N$$

This procedure is repeated for all available PUF data (CRPs). The model is sufficient when the error rate is indistinguishable from the PUF device's natural error rate. In some embodiments, thirty-two 64-bit challenges each producing a 64-bit response are sufficient to generate a model of a single 64-multiplexer PUF-chain. By combining two such chains, for example with an XOR, the same model could require well over $2^{64}$ challenges. Thus a manufacturer could model the two chains independently and then sever the direct chain outputs, limiting future use to the XOR output. This makes it computationally difficult to recreate the model.

In some examples, the RFID-based techniques described above are implemented in an ISO 14443-A compliant, HF 13.56 operating frequency RFID device. The challenge and response lengths are configurable at length 64, 128, or 256 bits. The device has a 512 bit user memory. In some examples, the challenge-response interaction is performed using standard over-the-air commands by using a memory mapped address to receive a challenge, with the PUF output being written to another memory mapped register. Therefore, a sequence of a write to provide the challenge, followed by a read to retrieve the response is used. In some examples, a new challenge-response command is used so that only a single interaction is used to both provide the challenge and retrieve the response.

The techniques described above can be used in combination with the systems described in co-pending application Ser. No. 11/273,920. For example, these techniques may be used to authenticate devices other than proximity devices. While these techniques are described in terms of RFIDs and RFID readers, it is useful to note that other devices (including proximity devices and readers) can also make use of these techniques. Examples include Bluetooth enabled devices that use PUF circuits to verify a connection; portable media devices that use PUF circuits to verify the device, e.g., when downloading media to the device; cell phones that use PUF circuits to verify the phone when connecting to the network. Additionally, RFIDs are seen in a variety of contexts, including use in counterfeit-proofing goods (e.g., medications, electronics, or designer bags) and carrying personal information (e.g., security badges, mass-transit passes, or passports). As RFIDs become more prevalent, RFID readers also become more prevalent. For example, cell phones can be built to include an RFID reader so that the cell phone can be used to authenticate an RFID by communicating with the central authority. Different techniques are suitable for different circumstances.

Examples of the approaches described above can be implemented in hardware, in software, or a combination of hardware of software. Hardware can include custom integrated circuits, or configurable circuits, such as Field Programmable Gate Array (FPGAs). Hardware implementation can be specified according to circuit specification instructions that are stored on computer readable media, for example, in the form of configuration data for FPGAs or in the form of a Hardware Description Language (HDL), such as Verilog. Software implementations can includes instructions, stored on computer readable media, for controlling execution of a general purpose or a special purpose controller or processor. For example, an authentication station may include a general purpose processor that is controlled by a stored program, and a proximity device may include a special purpose control processor that is controlled by instructions that are stored on the device.

It is to be understood that the foregoing description is intended to illustrate and not to limit the scope of the invention, which is defined by the scope of the appended claims. Other embodiments are within the scope of the following claims.

What is claimed is:

1. A method for authenticating a device using an authentication station, said device providing a capability to accept a challenge value from the authentication station and return a response value to the challenge value to the authentication station that depends on fabrication characteristics of the device, the method comprising:
   identifying the device, including accepting identification data at the authentication station from the device to be authenticated;
   determining authentication data characterizing one or more pairs of challenge and response values associated with the identified device that were previously obtained by a trusted authority in communication with the device, wherein said determining of the data includes securely receiving the data characterizing the one or more pairs of challenge and response values directly from the device at the authentication station and does not require communication between the authentication station and the trusted authority after identifying the device;
   providing a first challenge value from the authentication station to the device;
   accepting a first response value at the authentication station from the device;
   determining whether the pair of the first challenge value and the first response value sufficiently match the authentication data.

2. The method of claim 1 wherein the identification data represents and Electronic Product Code (EPC) associated with the device.

3. The method of claim 1 wherein the authentication station comprises one of a plurality of distributed authentication stations associated with the trusted authority.

4. The method of claim 1 further comprising:
   determining the first challenge value as a preceding value to a second challenge value in a deterministic sequence associated with the device; and
   determining a second response value from the accepted first response value;
   wherein determining whether the pair of the first challenge value and the first response value sufficiently match according to the authentication data comprises determining whether the pair of the second challenge value and the second response value sufficiently match according to the authentication data.

5. The method of claim 1 wherein the device comprises a radio frequency proximity device and the steps of accepting the identification data, providing the first challenge, and accepting the first response each comprise communicating between the authentication station and the radio frequency proximity device using a radio communication protocol.

6. The method of claim 5 wherein the radio communication protocol is compatible with an ISO 14443 standard.

7. The method of claim 1 wherein securely receiving the data from the device comprises:
   accepting an encryption of the authentication data at the authentication station from the device.

8. The method of claim 7 further comprising, prior to identifying the device, receiving decryption information for decrypting the encryption of the data accepted from the device.

9. The method of claim 1 wherein the authentication data comprises model parameters sufficient to predict a response value for any challenge value.

10. The method of claim 9 wherein the model parameters comprise delay parameters corresponding to delay elements in the device according to which response values are determined at the device.

11. The method of claim 9 further comprising selecting a challenge value at the authentication station and determining a predicted response value for the selected challenge according to the model parameters, and wherein determining whether the pair of the first challenge value and the first response value sufficiently match according to the authentication data includes determining whether the first response value sufficiently matches the predicted response value.

12. The method of claim 1 further comprising determining additional authentication data at the authentication station suitable for further authentication of the device, including generating one or more additional challenge values, providing the challenge values to the device, and accepting corresponding response values from the device.

13. The method of claim 12 further comprising providing the additional authentication data to the trusted authority.

14. The method of claim 12 further comprising providing an encryption of the additional authentication data to the device.

15. A method for authenticating a device using an authentication station, said device providing a capability to accept a challenge value from the authentication station and return a response value to the challenge value to the authentication station that depends on fabrication characteristics of the device, the method comprising:
   identifying the device, including accepting identification data at the authentication station from the device to be authenticated;
   determining authentication data characterizing one or more pairs of challenge and response values associated with the identified device that were previously obtained by a trusted authority in communication with the device, wherein the authentication data comprises model parameters sufficient to predict a response value for each of a plurality of challenge values for which response values have not been provided from the device;
   providing a first challenge value from the authentication station to the device;
   accepting a first response value at the authentication station from the device;
   determining whether the pair of the first challenge value and the first response value sufficiently match the authentication data.

16. The method of claim 15 wherein the model parameters comprise delay parameters corresponding to delay elements in the device according to which response values are determined at the device.

17. The method of claim 16 wherein determining the predicted response includes predicting a plurality of delay values corresponding to the delay elements according to the model parameters and the first challenge, and determining the response by combining the plurality of delay values.

18. The method of claim 15 further comprising selecting a challenge value at the authentication station and determining a predicted response value for the selected challenge according to the model parameters, and wherein determining whether the pair of the first challenge value and the first response value sufficiently match according to the authentication data includes determining whether the first response value sufficiently matches the predicted response value.

19. The method of claim 18 wherein a response to the selected challenge has not previously been received from the device, and determining the predicted response value includes numerically simulating operation of the device according to the model parameters to determine the predicted response.

* * * * *